(12) United States Patent
Goia et al.

(10) Patent No.: US 8,529,963 B2
(45) Date of Patent: Sep. 10, 2013

(54) METHOD FOR PREPARING DISPERSIONS OF PRECIOUS METAL NANOPARTICLES AND FOR ISOLATING SUCH NANOPARTICLES FROM SAID DISPERSIONS

(75) Inventors: Dan V. Goia, Potsdam, NY (US); Benjamin Morrow, Queensbury, NY (US); Egon Matijevic, Potsdam, NY (US); Krishna Balantrapu, Marlborough, MA (US); Brendan P. Farrell, Cranston, RI (US)

(73) Assignee: Umicore AG & Co. KG, Hanau-Wolfgang (DE)

( * ) Notice: Subject to any disclaimer, the term of this patent is extended or adjusted under 35 U.S.C. 154(b) by 310 days.

(21) Appl. No.: 12/811,985

(22) PCT Filed: Jan. 9, 2009

(86) PCT No.: PCT/US2009/000130
§ 371 (c)(1),
(2), (4) Date: Nov. 29, 2010

(87) PCT Pub. No.: WO2009/131603
PCT Pub. Date: Oct. 29, 2009

(65) Prior Publication Data
US 2011/0064825 A1 Mar. 17, 2011

Related U.S. Application Data

(60) Provisional application No. 61/010,515, filed on Jan. 9, 2008, provisional application No. 61/065,060, filed on Feb. 9, 2008.

(51) Int. Cl.
*A61K 9/14* (2006.01)
*A61K 31/28* (2006.01)
*A61K 33/24* (2006.01)
*A61K 33/26* (2006.01)
*A61K 33/38* (2006.01)

(52) U.S. Cl.
USPC ........... 424/617; 514/495; 514/492; 424/489; 424/618; 424/646; 424/649; 977/773; 977/777

(58) Field of Classification Search
USPC ......... 424/489, 617, 618, 646, 649; 514/492, 514/495; 977/723, 777
See application file for complete search history.

(56) References Cited

U.S. PATENT DOCUMENTS

2006/0090596 A1 5/2006 Goia
2006/0235087 A1 10/2006 Alexandridis et al.

FOREIGN PATENT DOCUMENTS

| JP | 2003/213311 A | 7/2003 |
| JP | 2004/073964 A | 3/2004 |
| WO | 93/15117 A | 8/1993 |
| WO | 2006/050248 A2 | 5/2006 |

OTHER PUBLICATIONS

Huang et al. "Synthesis of Chitosan-Stabilized Gold Nanoparticles in the Absence/Presence of Tripolyphosphate," Biomacromolecules 2004, 5, pp. 2340-2346.*
J. A. Holhoff and Th. G. Overbeek, "Determination of Equilibrium Constants for a Number of Metal-Phosphate Complexes," Recueil, 1959, 78, pp. 759-781.*
Huang et al. "Synthesis of Chitosan-Stabilized Gold Nanoparticles in the Absence/Presence of Tripolyphosphate," Biomacromolecules 2004, 5, pp. 2340-2346 and three pages of supplemental information.*
Daniel Andreescu, E .A.: "A simple route for manufacturing highly dispersed silver nanoparticles" J. Mater. Res., vol. 22, No. 9, Sep. 2007, pp. 2488-2496, XP002550382.
B.J. Morrow, E. Matijevic, D.V. Goia, "Preparation and stabilization of monodisperse colloidal gold by reduction with aminodextran," J. Colloid Interface Sci., 2009, doi: 10.101/j.jcis.2009.02.053.
Ying Ma, et al., "One-step synthesis of amino-dextran-protected gold and silver nanoparticles and its application in biosensors," Anal. Bioanal. Chem., Jun. 2005, vol. 382, No. 4, pp. 1044-1048 XP019327424.
Internat'l Search Report and Written Opinion, dated Feb. 9, 2010, for PCT/US2009/000130.

* cited by examiner

*Primary Examiner* — James H Alstrum Acevedo
(74) *Attorney, Agent, or Firm* — Levin Santalone LLP; John Santalone

(57) ABSTRACT

The present invention is directed to a method for preparing colloidal dispersions of precious metal nanoparticles selected from the group consisting of Pt, Au, Pd, Ag, Rh, Ru and mixtures or alloys thereof, and to a method for isolating such precious metal nanoparticles from these colloidal dispersions. The colloidal dispersions are prepared by reducing suitable precious metal precursor compounds in aqueous alkaline solutions at reaction temperatures between 40 and 70° C. and a pH≧12.0 in the presence of polysaccharides with average molecular weights ($M_w$) in the range of 300,000 to 1,000,000. The precious metal nanoparticles are isolated after decomposing the polysaccharide by heating the colloidal dispersions to temperatures >80° C. The nanoparticles can be used for the manufacture of core/shell-type catalyst materials and for electronic, decorative and medical applications.

28 Claims, 3 Drawing Sheets

Figure 1

UV/VIS spectrum of the gold dispersion (Example 1)

Figure 2

FE-SEM image of gold particles at 300.000x magnification (Example 1)

Figure 3

FE-SEM image of gold particles of Comparative Example 4 (CE4)

METHOD FOR PREPARING DISPERSIONS OF PRECIOUS METAL NANOPARTICLES AND FOR ISOLATING SUCH NANOPARTICLES FROM SAID DISPERSIONS

BACKGROUND OF THE INVENTION

The present invention is directed to a method for preparing colloidal dispersions of precious metal nanoparticles and to a method for isolating such precious metal nanoparticles from these dispersions. The methods disclosed herein describe the preparation of highly concentrated dispersions of nano-size precious metal particles by reducing the corresponding ions in aqueous alkaline solutions with polysaccharides and the subsequent isolation of such particles.

Colloidal dispersions of precious metal nanoparticles (as well as the nanoparticles isolated from such dispersions) are gaining importance in electronic applications; for example for the generation of conductive lines and patterns. They further find use in catalyst applications, for example for the preparation of core/shell type catalyst materials. Furthermore, they can be used in medical and therapeutical as well as in decorative applications.

The term "nanoparticle" as used in the context of this invention refers to particles with a medium particle size in the range of <200 nm (<0.2 micron) as determined by conventional electron microscopy methods (SEM/TEM).

In recent years, fine metallic particles, particularly nanoparticles of definite shape and size have received considerable interest, and attention because of their fascinating properties and potential applications, e.g. in semiconductors, consumer products, opto-electronics, electronics, catalysis, transportation, energy, medical sciences and biotechnology. The intrinsic properties of fine metallic particles are mainly determined by their size, shape, composition, crystallinity and structure.

A number of techniques have been proposed for the preparation of fine precious metal particles, including alcohol reduction, the polyol process, sonochemical methods, decomposition of organometallic precursors, vaporisation-condensation methods and electrolysis of bulk metals. Generally, precious metal particles are prepared in a reduction process employing reducing agents such as organic acids, alcohols, polyols, aldehydes, sugars etc. (ref to D. V. Goia, E. Matijevic, *New. J. Chem.* 1998, pages 1203-1215). In this reduction process, a suitable precious metal compound is reduced in an acidic or alkaline environment to the metal with oxidation state zero (0). The chemical reducing agents commonly used are toxic and/or carcinogenic compounds (e.g. hydrazine, sodium borohydride, formaldehyde) and cause safety and health problems in volume production.

In the well known polyol process, silver nanoparticles are prepared by the reduction of silver nitrate with ethylene glycol at about 160° C. The ethylene glycol serves as reductant and solvent. Typically, stabilizing/dispersing agents such as polyvinylpyrolidone (PVP) are employed (ref to Y. Sun and Y. Xia, *Science*, Vol. 298, 2176-2179 (2002)). The drawbacks with this process are the high energy consumption, the use of expensive organic glycol solvent and the recycling of waste solvent after use.

US 2002/0034675 is directed to precious metal nanoparticles, which are embedded in an aqueous solution of a temporary stabilizer. The nanoparticles are manufactured by reduction of chloride-free precursor compounds in water in the presence of a polysaccharide functioning as a stabilizer. Reducing agents such as hydrogen, hydrazine or ethanol are applied.

EP 796 147 B1 discloses surfactant-stabilized colloids of mono- and bimetallic particles of the groups VIII and IB of the Periodic System of the Elements (PSE) having particle sizes in the range of 1 to 10 nm. They are prepared by a reduction process in the presence of strongly hydrophilic surfactants. Chemical reducing agents such as hydrides, hydrogen or alkali formiates are applied.

WO 2007/112926 teaches a process for manufacture of silver-based particles via an intermediate silver (+1)-oxide species. Due to the presence of an organic dispersing agent, the silver (+1)-oxide species is thermally instable and decomposes to metallic silver upon heating to temperatures in the range of 45 to 90° C. This process is a two-step process and therefore time-consuming and costly.

US 2006/0090598 A1 discloses an aqueous-based method for producing ultra-fine silver powders by reducing a silver-ammonia complex with glucose and arabic gum. A similar route for manufacturing of highly dispersed silver nanoparticles by reducing the silver ammonia complex $[Ag(NH_3)_2]^+$ with glucose in the presence of a stabilizing agent was reported recently; ref to D. Andreescu, C. Eastman. K. Balantrapu and D. Goia, *J. Mater. Res.*, Vol. 22, No. 9, 2488-2495 (2007). This process, employing a reducing agent as well as a stabilizing agent, yields silver particles with an average particle size of about 30-120 nm.

U.S. Pat. No. 5,248,772 describes the formation of colloidal metal dispersions using aminodextrans as reductants and dispersing agents. Colloidal metal particles, preferably gold and silver particles, having a crosslinked aminodextran coating with pendent amine groups attached thereto are generated. Such coated particles can be used as markers in immunological and biological assays and as therapeutic agents. The process described in the patent is suitable for highly diluted precious metal salt solutions (typical concentrations in the range of 0.2 to 0.84 mMol metal/l). The precious metal salt solutions ($HAuCl_4$ and $AgNO_3$) are used as received; thus the aminodextrane is applied in acidic environment and no adjustment of the pH is conducted. Due to the low precious metal concentrations employed, the process suffers from a low yield.

As a result, the presently known processes for preparation of precious metal nanoparticle dispersions and nanoparticles therefrom are not satisfactory in terms of cost, yield, process simplicity, environmental safety, and energy consumption.

It was therefore an objective of the present invention to provide improved methods for the manufacture of precious metal nanoparticle dispersions and for the isolation of the precious metal nanoparticles therefrom. The methods should offer high yields and should be versatile, simple, straightforward, environmentally friendly, cost-efficient and energy-saving. This objective can be met by the methods of the present invention.

SUMMARY OF THE INVENTION

The present invention is directed to a method for preparing colloidal dispersions of precious metal nanoparticles and to a method for preparing said precious metal nanoparticles by isolating them from such dispersions. The colloidal dispersions are prepared by reducing the corresponding precious metal precursor compounds in aqueous alkaline solutions under specific conditions using a polysaccharide as reductant and dispersant.

The first embodiment of the invention is directed to a method of preparing a colloidal dispersion of precious metal nanoparticles by reducing a corresponding precursor compound in an aqueous reaction mixture with a polysaccharide, wherein
a) the reaction temperature is in the range of 40 to 70° C.,
b) the pH of the reaction mixture is $\geq 12.0$ and
c) the average molecular weight ($M_w$) of the polysaccharide is in the range of 300,000 to 1,000,000.

In general, the precious metal concentration of the colloidal dispersion is in the range of 10 to 60 mmol metal/L, preferably in the range of 20 to 50 mmol metal/L. Typically, the reaction temperature is in the range of 40 to 70° C., preferably in the range of 50 to 70° C. The typical reaction time is in the range of 1 to 10 hours, preferably in the range of 1 to 8 hours.

In a second embodiment, the invention is directed to a method of preparing precious metal nanoparticles, comprising the steps of
a) preparing a colloidal dispersion of precious metal nanoparticles by reducing a corresponding precursor compound in an aqueous reaction mixture with a polysaccharide, wherein the reaction temperature is in the range of 40 to 70° C., the pH of the reaction mixture is $\geq 12.0$, and the average molecular weight ($M_w$) of the polysaccharide is in the range of 300,000 to 1,000,000,
b) heating the resulting colloidal dispersion to a temperature >80° C. for a time sufficient to decompose the polysaccharide; and
c) separating the precious metal nanoparticles from the reaction mixture.

The decomposition of the polysaccharide is conducted by heating the colloidal dispersion for at least 2 hours, preferably at least 3 hours above the specified temperature (>80° C.). The method may further comprise at least one washing step and/or drying step to clean the isolated nanoparticles.

Generally, for both methods, the nanoparticles comprise precious metals selected from the group consisting of platinum (Pt), gold (Au), palladium (Pd), silver (Ag), rhodium (Rh) and ruthenium (Ru), and mixtures, alloys and/or combinations thereof.

DETAILED DESCRIPTION OF THE INVENTION

The methods of the present invention are now described in detail.

As already outlined, the nanoparticles comprise precious metals selected from the group consisting of Pt, Au, Pd, Ag, Rh, Ru and mixtures, alloys and/or combinations thereof. In particular, "core/shell"-type nanoparticles may be prepared, which comprise different precious metals as core and as shell material. Examples are Ag/Pt nanoparticles (comprising a silver core and a platinum shell) and Pd/Pt (comprising a palladium core and a platinum shell). Other metal combinations and mixtures/alloys (including suitable base metals such as Cu or Ni) are possible.

The first embodiment of the invention is directed to a method of forming colloidal, aqueous dispersions (also called "sols") of precious metal nanoparticles. A simple and reproducible method is disclosed, which yields concentrated, stable precious metal dispersions by using a polysaccharide as reductant and dispersant. Preferably, DEAE-Dextran-hydrochloride (Diethylamino-ethyl-dextran-hydrochloride, commonly referred to as "aminodextran") or gum Arabic ("Arabic gum") is employed.

Water-soluble, ionic compounds of the precious metals, such as metal nitrates, sulfates, acetates, chlorides, bromides, iodides, and/or the corresponding hydrates, hydroxo-, amino-, or ammonia complexes may be employed as precursor compounds for the present invention. Generally, mixtures or combinations of the precursor compounds may be used. This may be advantageous for example in the case of simultaneous or sequential reduction procedures. Suitable precursor compounds are, for example, tetrachloroauric(III)-acid ($HAuCl_4$), hexachloroplatinum(IV)-acid ($H_2PtCl_6$), platinum(II)-nitrate ($Pt(NO_3)_2$, silver(I)—nitrate ($AgNO_3$), silver(I)-ammonia complex $[Ag(NH_3)_2]^+$, silver(I)-hydroxo complex $[Ag(OH)_2]^-$, palladium(II)-nitrate ($Pd(NO_3)_2$), rhodium (III)-nitrate ($Rh(NO_3)_3$) and ruthenium(III)-chloride hydrate ($RuCl_3 \times H_2O$). These precursor compounds are commercially available from a variety of different sources or may be prepared by standard methods.

In the present invention, the polysaccharide employed plays a dual role in the preparation method: it acts as a reducing agent ("reductant") and as a dispersing agent ("dispersant"). When acting as a reductant, the polysaccharides reduce the metal ionic species to the corresponding metal having an oxidation state of zero (0). When acting as a dispersant, the polysaccharide macromolecule stabilizes the reduced metal particle in dispersion by blocking its surface and preventing agglomeration and aggregation of individual particles. Thus, an improved method is obtained, providing a better control of the nucleation and growth of the nanoparticles as well as improved stability at high metal concentration of the colloid dispersions. As a result, more uniform and better dispersed (i.e. better deagglomerated) nanoparticles compared to conventional processes are obtained.

The polysaccharide molecules (linear or branched) must contain as building blocks a sufficiently high fraction of mono- and disaccharides with reducing properties. The list of suitable reducing building blocks which need to be present includes but is not limited to dextrose, sucrose, fructose, glucose, etc. Examples of macromolecular polysaccharides which can act as reductants/dispersants are compounds which occur in nature (such as gum Arabic, gum Tragacanth, gum Carageenan, dextran, starch, etc). Additionally, natural polysaccharide products, subsequently modified by substitution with various functional groups (i.e. amino groups, sulphate, etc.) may be used. A preferred polysaccharide is gum Arabic ("Arabic gum"). Another preferred polysaccharide is DEAE-Dextran hydrochloride or (diethyl-aminoethyl)-dextran, commonly referred to as "aminodextran". This compound is a polycationic derivative of Dextran and is produced by reacting diethylaminoethyl chloride with Dextran. It is supplied in the hydrochloride form; however, other forms of the compound are also suitable. The degree of substitution corresponds to approximately one DEAE-substituent per three glucose units. It should be mentioned that mixtures and variations of the listed polysaccharides may be also be employed.

The molecule of the polymer/polysaccharides must be large enough to ensure that the fragments resulting when the polymeric chains are cleaved as a result of the oxidation of the saccharide molecules are still sufficiently large to act as effective dispersing agents. The average (=medium) molecular weight ($M_w$) of the polysaccharides suitable for the present invention is in the range of 300,000 to 1,000,000, preferably 500,000 to 1,000,000. If this condition is satisfied, the aggregation of the metallic nanoparticles is prevented and stable sols are obtained even at high concentrations of metal. For the polysaccharide DEAE-Dextrane hydrochloride, the average molecular weight molecular weight ($M_w$) is in the range of ≧500,000. It was found that the use of polysaccharides with lower average molecular weights (i.e. $M_w$<300,000) leads to inferior results, as these polysaccharides are not capable of stabilizing the nano-particles once formed. This results in "necking" or "bridging" between the individual particles, caused by their rapid aggregation (ref to Comparative Example 4). Such particles are not suitable for the applications envisaged.

It was further found that the use of polysaccharides with an average molecular weight above the specified range (i.e. $M_w$>1,000,000) leads to inferior results. This may be due the increased viscosity of the reaction mixture, particularly in the case that higher amounts of polysaccharide are employed. In addition, it was found that the subsequent isolation of the nanoparticles from the resulting dispersion is rendered more difficult.

One element, which allows the formation of the concentrated colloidal metal dispersions ("sols") is the finding of the inventors that under highly alkaline conditions (i.e. at pH values ≧12.0 preferably ≧12.2), the redox potential of the reducing functional groups in the polysaccharides backbone is decreased significantly and allows a rapid and complete reduction of the metal precursors at relatively mild temperatures. The list of bases that can be used to provide the alkaline conditions includes, but is not limited to, strong inorganic bases such as sodium hydroxide (NaOH), potassium hydroxide (KOH), lithium hydroxide (LiOH) and ammonium hydroxide ($NH_4OH$) or combinations thereof.

Typically the reaction temperature (i.e. the temperature of the reaction mixture, at which the reduction reaction is occurring) is in the range of 40 to 70° C., preferably in the range of 50 to 70° C. Furthermore, for the preparation of colloidal gold (Au) dispersions, the preferred reaction temperature is 50° C.

The reaction time, i.e. the time required for a complete reduction of the metal species and for the formation of the precious metal nanoparticle dispersions, is in the range of 1 to 10 hours, preferably in the range of 1 to 8 hours. It should be noted, that the method of the present invention is rapid and proceeds to completion only, if the specified conditions given above (i.e. pH-value, type and molecular weight of the polysaccharide, temperature range) are met.

The preparation method is generally conducted in aqueous reaction mixtures, using deionized (D.I.) water. In a standard procedure, the polysaccharide is first dissolved in a sufficient amount of water. Then the precious metal precursor solution is prepared separately and brought to the required pH value by the addition of a suitable base in the amount required. Thereafter; the polysaccharide solution is added to the precious metal precursor solution under stirring. The reaction mixture is held at the specified temperature range for a sufficient time period as outlined above. Further details are given in the Examples.

The amount of polysaccharide required depends on its content in reducing building blocks. Furthermore, the oxidation state of the employed precious metal ion must be considered. In general, the amount of polysaccharide should be in excess of 30 wt.-% (30% w/w) of the mass of the metal. Preferably the amount of polysaccharide should be in excess of 50 wt.-% of the mass of the metal. This amount provides sufficient reducing moieties to convert completely the metallic species to the metal without causing the excessive fragmentation of the polysaccharide backbone. Such excessive fragmentation could lead to the formation of entities too small to prevent the aggregation of the metallic nanoparticles.

Under the conditions of the method of the present invention, the reducing power of the polysaccharide is maximized and a complete reduction of the precious metal precursors in reasonable reaction time periods is ensured, while generating very stable colloid dispersions ("sols"). The precious metal nanoparticle dispersions obtained by the method of the present invention are characterized by a high metal concentration of the colloid dispersion. Typically, the precious metal concentration in the reaction mixture (and, after complete reduction, in the resulting colloidal dispersion) is in the range of 10 to 60 mMol metal/L, preferably in the range of 20 to 50 mMol metal/L. Such metal concentrations are at least one order of magnitude higher than other reported methods. Due to the high metal concentrations employed, the method of the present invention offers high yields of metal nanoparticles and is therefore suitable for industrial production.

According to the second embodiment of the present invention, the precious metal nanoparticles are isolated from the dispersion in powder form. This is achieved by decomposing the polysaccharide macromolecule in a subsequent heating step to temperatures >80° C. for at least 2 hours, preferably for at least 3 hours. After the decomposition of the polysaccharide, the precious metal nanoparticles settle and the supernatant solution can be decanted. By this way, the precipitated nanoparticles can be isolated from the reaction mixture. The resulting solids are washed several times with D.I. water and/or alcohol to remove polysaccharide residues adsorbed to the particle surface. The isolated nanoparticles may be dried therafter (for example by freeze-drying).

Generally, the medium particle size of the precious metal nanoparticles prepared according to the present invention is in the range of 1 to 100 nm, preferably in the range 1 to 50 nm, as determined by conventional electron microscopy methods (SEM/TEM).

It was found that the methods of the present invention provide precious metal nanoparticles with organic residues, which can be easily removed from the surface by simple cleaning/washing steps. Generally, the precious metal nanoparticles obtained by the present invention comprise <1 wt.-% of residual polysaccharides, as detected by thermographimetric analysis (TGA). Due to their dean, low-residue surface, the precious metal nanoparticles are well suited as core materials for the manufacture of core/shell type catalyst particles.

The following examples illustrate the invention but do not restrict its scope.

EXPERIMENTAL DETAILS

Reagents: Silver nitrate was purchased from Ames Goldsmith Corporation. Tetrachloroauric(III)-acid solution ($HAuCl_4$, gold concentration 23.0 wt.-%), Hexachloroplatinic (IV)-acid solution ($H_2PtCl_6$; platinum concentration 33.57 wt.-%) and silver nitrate ($AgNO_3$) were supplied by Umicore/South Plainfield, N.J., USA.

NaOH (10 N) was purchased from Alfa Aesar, gum Arabic was obtained from Frutarom (North Bergen N.J./USA), DEAE-Dextran hydrochloride (average molecular weights ≧500,000 and ≧200,000) was purchased from Sigma-Aldrich and ammonium hydroxide ($NH_4OH$, 29%) from Fisher.

Particle Characterization: A Perkin Elmer Lambda 35 Diode Array UV/VIS spectrometer was used to record the spectra of the colloidal nanoparticle dispersions.

The particle morphology was investigated by field emission—scanning electron microscopy (FE-SEM) using JEOL- JSM6300 and JEOL-JSM7400F scanning microscopes and a JEOL-JEM 2010 transmission electron microscope (TEM).

The crystal structure of the particles was evaluated by X-ray powder diffraction (XRD) with a BRUKER D8 diffractometer.

The amount of residual dispersant was determined by thermographimetric analysis (TGA) with a Perkin-Elmer PYRIS 1 instrument.

The size distribution of the particles was obtained from FE-SEM images by measuring the diameter of at least 250 particles, as well as by dynamic light scattering with a "Zeta-Plus" zeta potential analyzer (Brookhaven Instruments Corp.).

EXAMPLES

Example 1

Preparation of a Gold Sol with DEAE-Dextran

In a first step, 37.95 g of DEAE-Dextran hydrochloride (average molecular weight $\geq 500,000$, Sigma-Aldrich) are dissolved in 330 mL deionized water in a 600 mL beaker. The dissolution step should last at least an hour. Separately in a 10 L beaker, 3.30 L of deionized water are heated to 50° C. under stirring. At this temperature, 141.32 g of high purity tetrachloroauric(III) acid solution ($HAuCl_4$, gold concentration 23.0 wt. %, supplied by Umicore/South Plainfield, N.J., USA) are added. This amount corresponds to 32.5 g (=0.165 Mol) of pure gold. Next, 157.34 g of a 10 N sodium hydroxide (NaOH) solution are slowly added to the gold solution over the course of several minutes. The slow addition prevents the possibility that a gold hydroxide precipitate will form if the local concentration of the base at the addition point is too high. The resulting pH of the solution is pH=12.2. The resulting ratio of poly saccharide/Au is ~120 wt.-% based on gold content. After the base has been added, the aminodextran solution is added rapidly to the stirred alkaline gold solution. Almost immediately, the reduction of gold ions starts as indicated by a dramatic color change from a clear yellow to a very dark purple. The reaction mixture is continued for 3 hours and 30 minutes at 50° C. during which time the gold is completely reduced. A stable colloidal dispersion containing gold nanoparticles in a concentration of about 42 mMol Au/L is obtained.

Figure 1:
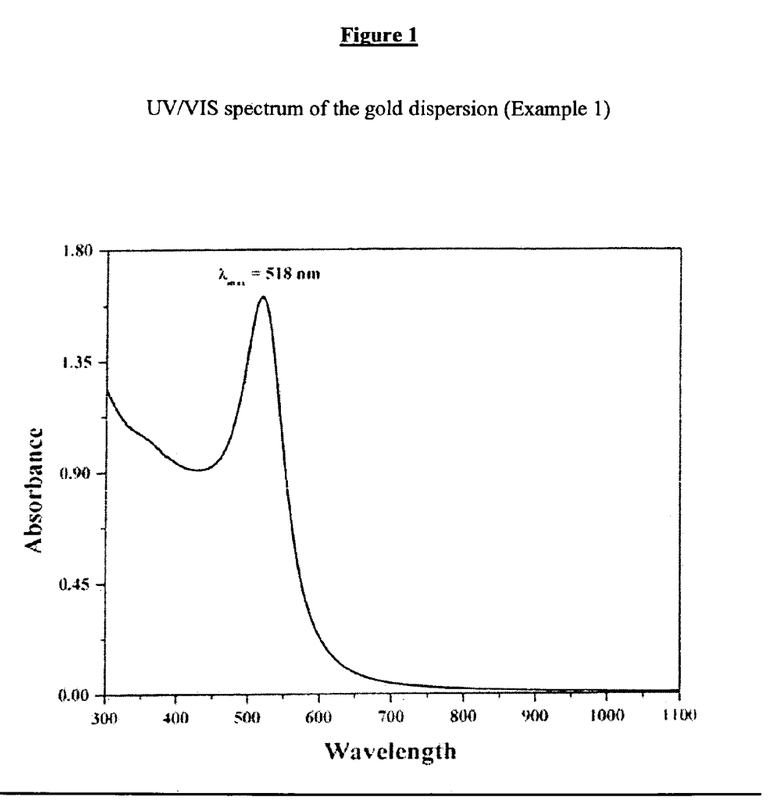
FIG. 1—UV/VIS spectrum of the gold dispersion for Example 1.
Figure 2:
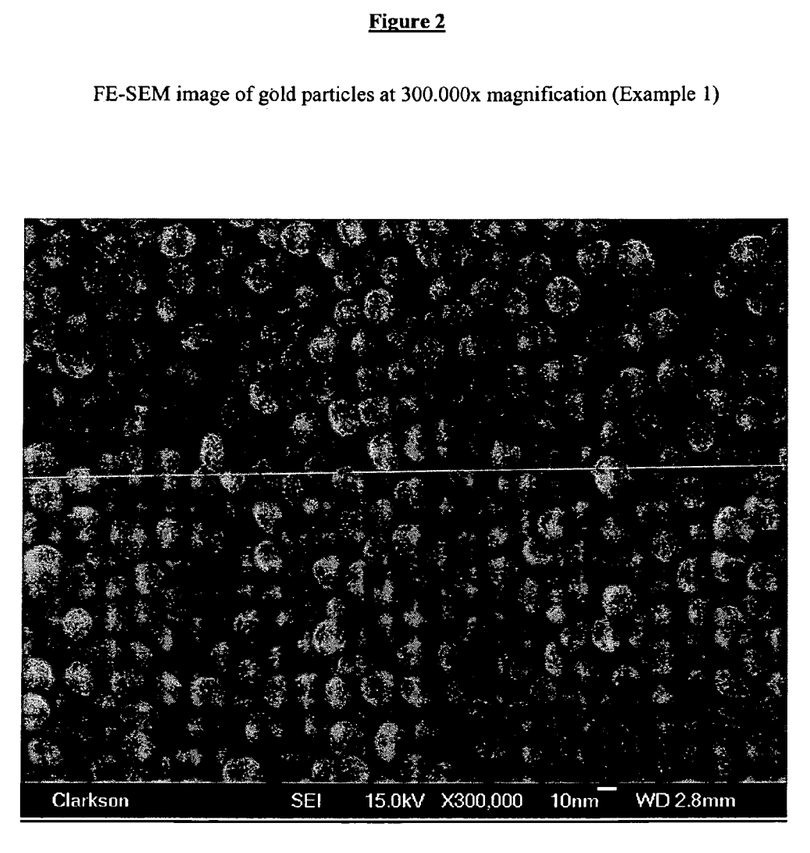
FIG. 2—FE-SEM image of the gold particles for Example 1.

Particles characterization: Once the reaction completed, the UV-VIS spectrum is recorded after appropriate dilution. The narrow Plasmon band has typically the wavelength of maximum absorption located at ~518 nm (ref to FIG. 1). The electron microscopy (Field-Emission Scanning Electron Microscopy, FE-SEM, after particle isolation) reveals the presence of very uniform gold particles with an average size of ~20 nm (ref to FIG. 2). The Scanning Transmission Electron Microscopy (HRSTEM) image indicates that the gold particles consist of single crystals.

Example 2

Preparation of Gold Nanoparticles with DEAE-Dextran

In this experiment, 8.57 g tetrachloroauric(III) acid solution ($HAuCl_4$, gold concentration 23.0 wt. %, containing 1.97 g or 0.01 mol Au) were added to 0.5 L of deionized water maintained at 50° C. in a 1 L jacketed glass beaker. The pH of the gold solution was subsequently adjusted to pH=12.2 by adding slowly 10 N NaOH solution. Next, 2.3 g of DEAE-Dextran hydrochloride (average molecular weight $\geq 500,000$, Sigma-Aldrich), previously dissolved in 50 mL DI water were poured rapidly into the reaction vessel under stirring. The mixture was continuously stirred at 50° C. for 7.5 hours during which time the Au (III) species were completely reduced, forming a stable gold sol. The UV-VIS spectrum of the final dispersion displayed a very sharp peak at 519 nm, a clear confirmation of the presence of highly dispersed gold nanoparticles. Once all gold was reduced, the dispersant aminodextran was decomposed by heating the dispersion at $\geq 84°$ C. for four hours. After the decomposition of the dispersant, the gold particles settled and the supernatant solution was decanted. The resulting solids were washed several times with water and ethanol, and filially freeze-dried.

Particles Characterization:

The FE-SEM of the isolated particles confirmed the presence of very uniform gold particles with a diameter of ~20 nm. The X-ray diffractogram of the dried particles was found to be typical for metallic gold. The crystallite size calculated by the Scherrer equation to the higher angle reflections (2.2.0 and 3.0.0) was ~12 nm, suggesting that these gold particles are likely single crystals. The weight loss determined by TGA indicated that the dried particles contained only a small amount (<1 wt.-%) of residual aminodextran.

Example 3

Reduction of Silver-Ammonia Complex with Arabic Gum

First, 4.5 g of Arabic gum (average molecular weight $\geq 300,000$; Frutarom, North Bergen N.J./USA) were dissolved in 260 ml of deionized water for 1 hour. The solution was then adjusted to pH=12.0 by adding the required amount of NaOH (10 N solution). In parallel, a silver-ammonia complex solution was prepared by dissolving 7.08 g of $AgNO_3$ in 25 mL of deionized water, adding 7.65 mL of $NH_4OH$ (29%) and filially adjusting the final volume to 100' mL. The silver complex solution is added quickly to the polysaccharide solution and the temperature was increased to 70° C. under vigorous stirring. The reaction is complete after maintaining the dispersion at 70° C. for about 1 hour resulting in the formation of a very stable dispersion as indicated by the well defined Plasmon band at 415 mu in the UV-VIS spectrum. The average size of the isolated silver nanoparticles is 30 nm.

Example 4

Reduction of Silver-Ammonia Complex with DEAE-Dextran

The reducing polysaccharide solution was prepared by dissolving 3.5 g of DEAE-Dextran hydrochloride (average molecular weight $\geq 500,000$, Sigma-Aldrich) in 300 mL of deionized water. The pH of the solution was next adjusted to pH=12.5 by adding required amount of NaOH (10 N) and the temperature is slowly increased to 55° C. Separately, a silver ammonia complex solution was prepared by dissolving 5.5 g of $AgNO_3$ in deionized water, then adding 6.0 mL of concentrated $NH_4OH$ solution (29%) and finally bringing the volume to 50 mL. The silver-ammonia solution was added under constant stirring to the aminodextran solution and the mixture was stirred over 1 hour while the temperature was maintained at 55° C. The UV-VIS spectrum of the silver dispersion and the FE-SEM images clearly show that the Ag nanoparticles formed (~20 nm in size) were uniform and had a very high degree of dispersion.

Example 5

Preparation of Platinum Nanoparticles with DEAE-Dextran 3.07 of DEAE-Dextran hydrochloride (average molecular weight ≧500,000, Sigma-Aldrich) is dissolved in 50 mL deionized water in a 100 mL beaker for at least one hour. Separately, an amount of 5.809 g hexachloroplatinic acid solution (33.57 wt.-% Pt; supplied by Umicore/South Plainfield, N.J., USA) is added to 500 mL deionized water in a 1 L jacketed beaker and the solution is heated to 75° C. Next, a 10 N NaOH solution is, slowly added to the platinum solution to raise the pH of the mixture to pH=12.2. After the base has been added, the aminodextran solution is added rapidly to the stirred alkaline platinum solution. After 10 hours the reduction is complete, the platinum particles are isolated by decomposing the dispersant as described in Example 2. The TEM analysis shows that the Pt particles were very small (2-3 nm) and uniform.

Comparative Example 1 (CE1)

Preparation of Gold Nanoparticles with DEAE-Dextran at pH=10

This comparative example was conducted as described in Example 2, however, the pH of the Tetrachloroauric(III) acid solution (HAuCl$_4$) was initially adjusted to pH=10.0 by adding slowly 10 N NaOH solution. Thereafter the aminodextran was added and all further steps were conducted as outlined in Example 2.

At pH=10, the reduction was significantly slower than at pH=12.2; it took several minutes for the color of the dispersion to change to violet-red and ~90 hours (=3.75 days) to completely reduce the gold. The resulting particles were still quite uniform, but their average diameter increased to 40 nm and the Plasmon-band in the UV-VIS spectrum shifted to 530 nm.

Comparative Examples 2 and 3 (CE2 and CE3)

Preparation of Gold Nanoparticles with DEAE-Dextran at 25° C. (CE2)

This comparative example was conducted as described in Example 2, however, the reaction temperature was maintained at room temperature (25° C.) during reduction. As a result, the reduction was considerably slower than in Example 2. Initial color changes were noticed only after several minutes and the red color characteristic of gold nanoparticles appeared only after several hours. About 16 days were necessary to completely reduce the gold species. The resulting gold nanoparticles were uniform and slightly larger than those obtained at 50° C.

Preparation of Gold Nanoparticles with DEAE-Dextran at 80° C. (CE3)

In contrast, the reduction at 80° C. yielded non-uniform, large gold particles/aggregates, which settled rapidly.

Comparative Example 4 (CE4)

Preparation of Gold Nanoparticles with DEAE-Dextran of Lower Molecular Weight In this comparative example, 2.3 g of DEAE-Dextran hydrochloride (average molecular weight (M$_w$)≧200,000, obtainable from Sigma-Aldrich) is dissolved in 50 mL deionized water in a 100 mL beaker. The dissolution step should last at least an hour. Separately, in a 1 L beaker, 500 mL of deionized water are heated to 50° C. under stirring. At this temperature, 8.57 g of Tetrachloroauric(III) acid solution (HAuCl$_4$, 23 wt.-% Au; Umicore, South Plainfield, N.J.) are added. This amount corresponds to 2 g of pure gold. Next, 9.54 g of a 10 N NaOH solution are slowly added to the gold solution over the course of several minutes, to reach a pH of 12.2. After the base has been added, the aminodextran solution is added rapidly to the stirred alkaline gold solution. Almost immediately, the reduction of gold ions starts as indicated by a color change from a clear yellow to a very dark purple. The reaction mixture is continued for 3 hours and 30 minutes at 50° C. during which time the gold is completely reduced.

Figure 3:
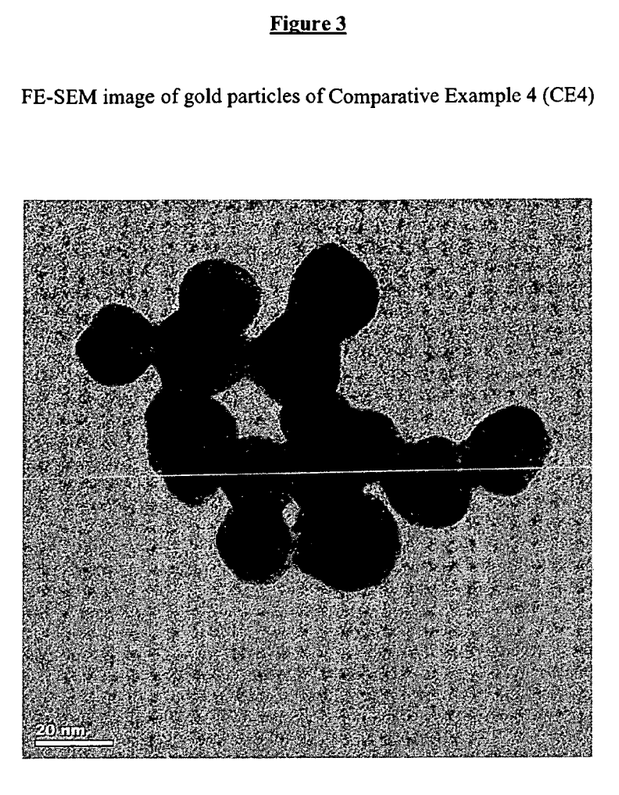
FIG. 3—FE-SEM image of the gold particles for Comparative Example 4.

UV-VIS spectroscopy is used to monitor to the progress of the reaction. The broadening of the peak seen the in spectrum and increased absorbance at higher wavelengths indicates an aggregation of the particles. This leads to the conclusion that lower molecular weight aminodextrans are not capable of stabilizing the nanoparticles once formed. Electron microscopy of the resulting particles clearly documents necking between the individual particles caused by their rapid aggregation (ref to FE-SEM picture in FIG. 3).

The invention claimed is:

1. A method for preparing a colloidal dispersion of precious metal nanoparticles by reducing a corresponding precursor compound of the precious metal in an aqueous reaction mixture with a polysaccharide, wherein
    a) the reaction temperature is in the range of 40 to 70° C.
    b) the pH of the reaction mixture is >12.0 and
    c) the average molecular weight (M$_w$) of the polysaccharide is in the range of 300,000 to 1,000,000.

2. The method according to claim 1, wherein the nanoparticles comprise precious metals selected from the group consisting of platinum (Pt), gold (Au), palladium (Pd), silver (Ag), rhodium (Rh) and ruthenium (Ru), and mixtures and combinations thereof.

3. The method according to claim 1, wherein the polysaccharide is Diethyl-aminoethyl-Dextran-hydrochloride ("DEAE-Dextran") or gum Arabic.

4. The method according to claim 1, wherein the polysaccharide is Diethyl-aminoethyl-Dextran-hydrochloride with an average molecular weight (M$_w$) of >500,000.

5. The method according to claim 1, wherein the precious metal concentration of the colloidal dispersion is in the range of 10 to 60 mMol metal/L.

6. The method according to claim 5, wherein the precious metal concentration of the colloidal dispersion is in the range of 20 to 50 mMol metal/L.

7. The method according to claim 1, wherein the amount of the polysaccharide in the reaction mixture is >30 wt.-%, based on the weight of the precious metal.

8. The method according to claim 1, wherein the reaction time is in the range of 1 to 10 hours.

9. The method according to claim 8, wherein the reaction time is in the range of 1 to 8 hours.

10. The method according to claim 1, wherein the corresponding precursor compound is selected from the group of precious metal nitrates, precious metal sulfates, precious metal acetates, precious metal chlorides, precious metal bromides, precious metal iodides, precious metal ammonia complexes, precious metal amino complexes, precious metal hydroxo complexes and mixtures or combinations thereof.

11. A method of preparing precious metal nanoparticles, comprising the steps of a) preparing a colloidal dispersion of precious metal nanoparticles by reducing a corresponding precursor compound of the precious metal in an aqueous reaction mixture with a polysaccharide, wherein the reaction temperature is in the range of 40 to 70° C., the pH of the reaction mixture is >12.0, and the average molecular weight ($M_w$) of the polysaccharide is in the range of 300,000 to 1,000,000, b) heating the resulting colloidal dispersion to a temperature >80° C. for a time sufficient to decompose said polysaccharide and c) separating the precious metal nanoparticles from the reaction mixture.

12. The method according to claim 11, further comprising at least one washing and/or drying step.

13. The method according to claim 11, wherein the precious metal nanoparticles comprise precious metals selected from the group consisting of platinum (Pt), gold (Au), palladium (Pd), silver (Ag), rhodium (Rh) and ruthenium (Ru), and mixtures, alloys and combinations thereof.

14. The method according to claim 11, wherein the polysaccharide is Diethyl-aminoethyl-Dextran-hydrochloride ("DEAE-Dextran") or gum Arabic.

15. The method according to claim 11, wherein the polysaccharide is Diethyl-aminoethyl-Dextran-hydrochloride with an average molecular weight ($M_w$) of >500,000.

16. The method according to claim 11, wherein the reaction time in step a) is in the range of 1 to 10 hours.

17. The method according to claim 16, wherein the reaction time in step a) is in the range of 1 to 8 hours.

18. The method according to claim 11, wherein the amount of the polysaccharide in the reaction mixture is >30 wt.-%, based on the weight of the precious metal.

19. The method according to claim 11, wherein the reaction time for decomposing the polysaccharide in step b) is at least 2 hours.

20. The method according to claim 19, wherein the reaction time for decomposing the polysaccharide in step b) is at least 3 hours.

21. The method according to claim 11, wherein the corresponding precursor compound is selected from the group consisting of precious metal nitrates, precious metal sulfates, precious metal acetates, precious metal chlorides, precious metal bromides, precious metal iodides, precious metal ammonia complexes, precious metal amino complexes and precious metal hydroxo complexes and mixtures or combinations thereof.

22. The method according to claim 11, wherein the medium particle size of the precious metal nanoparticles is in the range of 1 to 100 nm as determined by SEM/TEM.

23. The method according to claim 22, wherein the medium particle size of the precious metal nanoparticles is in the range of 1 to 50 nm, as determined by SEM/TEM.

24. A method of preparation of stable dispersions of nano-sized precious metals which comprises reducing corresponding ions of precious metals in an aqueous alkaline solution with DEAE-Dextranhydrochloride.

25. The method according to claim 24, wherein the precious metals are selected from the group consisting of platinum (Pt), gold (Au), palladium (Pd), rhodium (Rh) and ruthenium (Ru).

26. A method of preparation of dispersed gold nanoparticles comprising: reducing an aqueous alkaline solution of gold chloride with DEAE-Dextran hydrochloride at 55° C.

27. The method of claim 26, wherein the dextran is a reductant and dispersant.

28. The method of claim 26, wherein the molecular weight of the dextran before modification with DEAE (diethylaminoethyl-) is 500,000.

* * * * *

UNITED STATES PATENT AND TRADEMARK OFFICE
CERTIFICATE OF CORRECTION

PATENT NO.         : 8,529,963 B2                                        Page 1 of 1
APPLICATION NO.    : 12/811985
DATED              : September 10, 2013
INVENTOR(S)        : Dan V. Goia et al.

It is certified that error appears in the above-identified patent and that said Letters Patent is hereby corrected as shown below:

In the Claims

In claim 1, element (b) (Col. 10, line 32): replace ">" with -- $\geq$ --

In claim 4, line 3 (Col. 10, line 45): replace ">" with -- $\geq$ --

In claim 11, element (a), line 6 (Col. 11, line 6): replace ">" with -- $\geq$ --

In claim 15, line 3 (Col. 11, line 25): replace ">" with -- $\geq$ --

Signed and Sealed this
Sixth Day of May, 2014

Michelle K. Lee
*Deputy Director of the United States Patent and Trademark Office*